F. M. NALL.
FOWL FUMIGATOR.
APPLICATION FILED JULY 3, 1911.
1,040,387.
Patented Oct. 8, 1912.
2 SHEETS—SHEET 2.
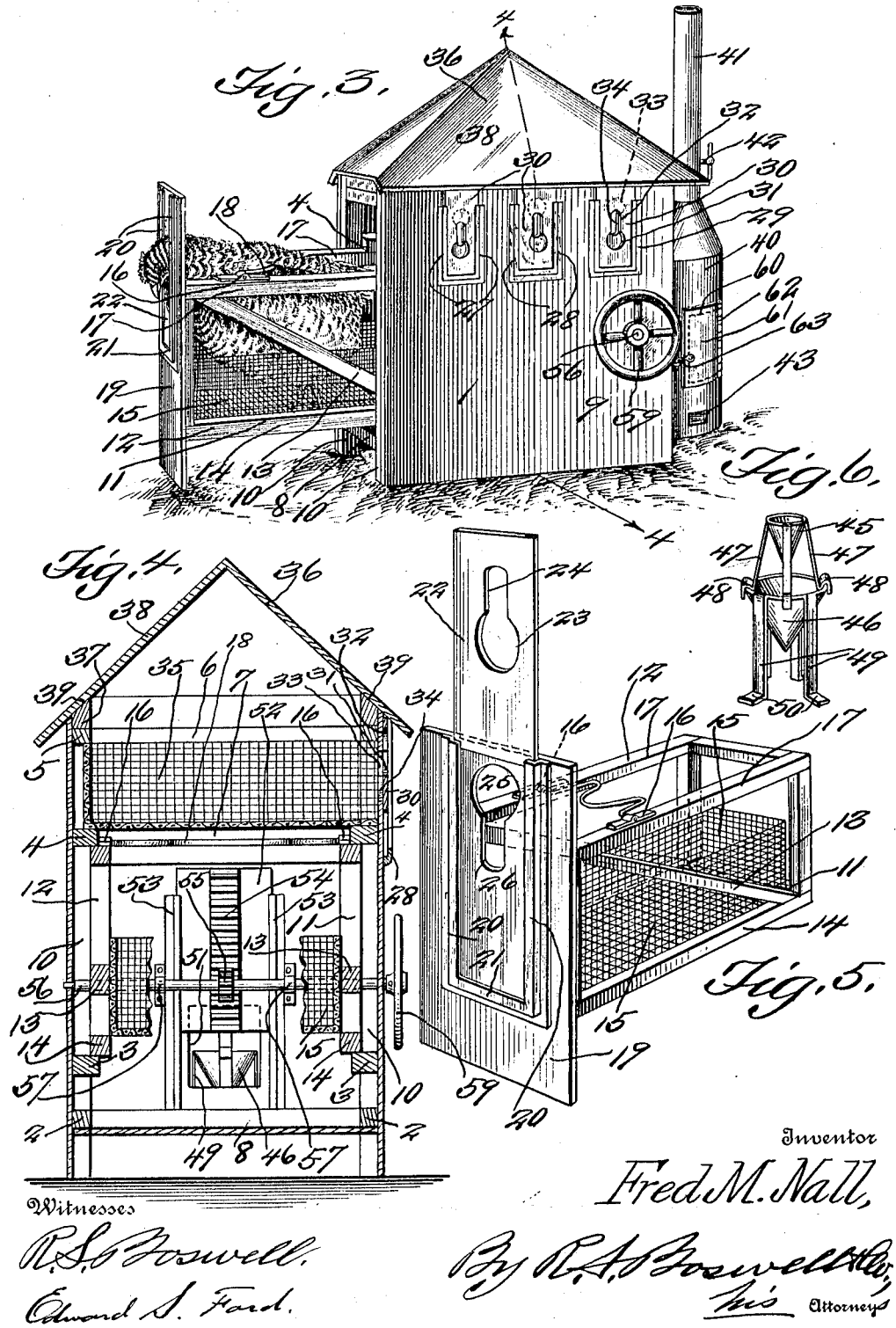

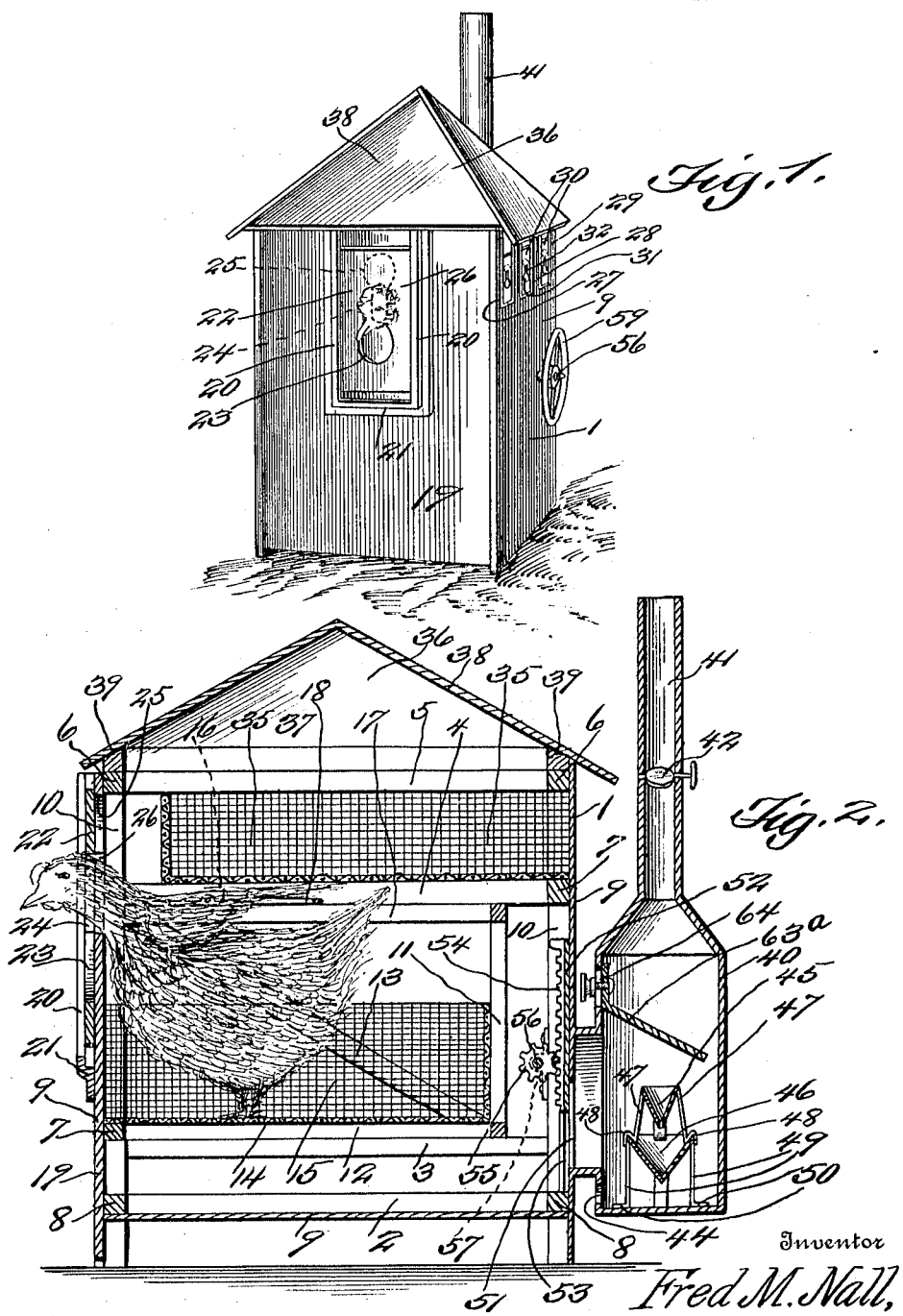

UNITED STATES PATENT OFFICE.

FRED M. NALL, OF PORT HENRY, NEW YORK.

FOWL-FUMIGATOR.

1,040,387.  Specification of Letters Patent.  Patented Oct. 8, 1912.

Application filed July 3, 1911. Serial No. 636,792.

*To all whom it may concern:*

Be it known that I, FRED M. NALL, a citizen of the United States of America, residing at Port Henry, in the county of Essex and State of New York, have invented a new and useful Fowl-Fumigator, of which the following is a specification.

This invention belongs to the art of fumigators, and it more particularly pertains to a new and useful fowl fumigator.

Fowls, such as hens and the like, are more or less filled or inhabited with vermin or other insects, especially while sitting, and it has been observed that this vermin or other insects multiply the most at this period, and unless they are relieved of them, a great many of the young, when hatched, are put to death by the pests.

As a primary object of the invention, it follows that, in this application there has been produced, a novel form of fumigator, adapted for exterminating the vermin or insects, by burning brimstone and peat or the like in an inclosure, in which the fowl is placed.

A further object of the invention is the provision of means, for regulating the fumes from the brimstone and peat, whereby they may be judiciously used.

A further feature of the invention, is the production of a drawer arranged slidably in the inclosure for holding the fowl.

A further feature of the invention, is a removable cover or closure for the inclosure, whereby young fowls or chickens, may be placed in a mesh-work receptacle above the drawer.

Another object of the invention is the provision of an adjustable means, for receiving the neck of the fowl so as to hold the head comfortably upon the exterior of the inclosure.

To relieve a fowl of vermin, the fowl is placed in the drawer of the fumigator. The drawer is then closed. The fowl is permitted to remain in the drawer for approximately ten seconds each day for a few days before the eggs are hatched.

The drawings disclose only one form of the invention, but in practical fields this form may necessitate certain alterations, to which the applicant is entitled, provided the alterations are comprehended within the scope of what is claimed.

The invention comprises further features and combinations of parts, as hereinafter set forth, shown in the drawings, and claimed.

In the drawings:—Figure 1, is a view in perspective, of a fumigator constructed in accordance with the invention, showing the head of the fowl held on the exterior of the fumigator. Fig. 2, is a longitudinal sectional view through the fumigator, showing a fowl in the drawer, and the sliding gate between the fumigator inclosure and the casing wherein the brimstone and peat is burned, raised so that the fumes from the brimstone and peat may pass into the inclosure. Fig. 3, is a view in perspective of the fumigator, showing the drawer with the fowl therein withdrawn from the inclosure. Fig. 4, is a transverse sectional view through the fumigator, upon line 4—4 of Fig. 3, in order to disclose clearly the means by which the gate between the inclosure and casing may be raised or lowered. Fig. 5, is a perspective view of the drawer removed from the inclosure, showing the adjustable means for receiving the head of the fowl and the wire member for supporting the wings of the fowl slightly above the body. Fig. 6, is a perspective view of the conical cups, one supported above the other, and in which the brimstone and peat are burned.

Referring more especially to the drawings in detail, 1 designates the inclosure of the fumigator, which comprises a skeleton framework consisting of the longitudinal beams 2, 3, 4, and 5, which are connected by the transverse beams 6, 7, and 8, about which sheets of three-ply veneer wood 9 is arranged. However, the longitudinal and transverse beams are connected to the vertical corner beams 10. By this construction a frame work is produced having strength, rigidity and durability.

The longitudinal beams or strips 3 constitute guide rails, on which the drawer 11 is slidable. The drawer consists of a rectangular skeleton frame 12, as shown in Fig. 5. This frame 12 is provided with diagonally arranged beams 13 which affords strength for the frame 12. Supported on the lower longitudinal beams 14, is a mesh work basket or other receptacle 15, in which the fowl is placed. Mounted in bearings 16 of the upper longitudinal beams 17 of the drawer is a wire wing holding member 18. This member 18 is designed for supporting the wings of the fowl above its body, so that the fumes from the brimstone and peat will thoroughly surround the body of the fowl, and percolate thoroughly through the feathers and down. The galvanized wire mesh work receptacle 15 may be removed for cleaning purposes. The forward portion of the drawer is provided with a face plate of three ply veneer wood, to correspond with the former veneering. This face plate 19 has secured to its outer face the guide strips 20 and the base strip 21. Between the guide strips 20 the slide member 22 is arranged, so as to be adjusted vertically. The slide 22 is provided with an opening 23, which adjoins the elongated opening 24. The face plate 19 is provided with correspondingly shaped openings 25 and 26, with which the openings 23 and 24, are brought into registration.

When a fowl is placed in the basket or receptacle 15, the slide 22 is moved until the openings 23 and 25 register, so that the head of the fowl may be passed therethrough. Subsequently the slide is adjusted so that the openings 24 and 26 register, whereby the neck of the fowl may be held in place, and because of the openings 24 and 26 being restricted in size, and especially smaller than the head of the fowl, the head cannot be withdrawn from the openings. However, the openings 23 and 25 are just large enough to receive the head. When the fowl is so placed, with its wings supported by the member 18 the drawer is pushed into the inclosure on the guide strips or rails 3, and below the strips or rails 4, which also act as guides.

The upper portion of one of the sides of the inclosure is provided with a plurality of guide strips 27, 28, and 29, which receive the slides 30 having openings 31 and 32, which are similar to the openings 23, 24, 25 and 26. These guides, slides, and the openings therein, and the openings 33 and 34 perform the same functions as the slide 22, and the openings 23, 24, 25, and 26, that is, in connection with the young fowls or chickens. The young chickens or fowls are placed in the mesh work basket or receptacle 35, which is supported on the beams or strips 4, as shown in Figs. 2 and 4. To place the young chickens in the basket or receptacle 35, the cover or closure 36 is removed. This cover or closure comprises the rectangular frame 37, to which the veneering 38 is suitably secured, as at 39.

Secured to the rear of the inclosure of the fumigator is a casing 40, which is cylindrical in contour and provided with an upwardly extending tubular extension 41, constituting a stack, through which the smoke and the like passes. This stack is provided with a damper 42, whereby the draft may be regulated. The casing 40 is provided with the openings 43 and 44, through which the draft may pass, for causing the brimstone in the cup 45 and the peat in the cup 46 to properly burn. The cup 45 is conical, and supported above the cup 46 by means of the legs 47. The legs 47 are formed with feet 48, which fit the peripheral edge of the cup 46. The cup 46 is correspondingly conical, and provided with legs 49, which also terminate into feet 50. By means of the legs 49 the cups 45 and 46 are supported in erect positions in the casing 40.

The fumes from the brimstone and peat pass through the opening 51, between the casing 40 and the inclosure, so as to reach the interior of the inclosure, so as to thoroughly saturate the body of the fowl, especially under its wings, whereby the vermin or the insects may be exterminated. This opening 51 is controlled or restricted by the gate 52, which is arranged slidably in the guides 53. To control or restrict the opening 51, the gate is raised or lowered. To raise or lower the gate, the same is provided with a rack 54, with which a pinion 55 meshes. This pinion is carried by and movable with the shaft 56, which is mounted in bearings 57, of the rear corner vertical beams 10. One end of the shaft 56 is provided with a hand wheel 59 whereby the shaft may be rotated. When the shaft is rotated the gate 52 is raised or lowered, by the intermeshing of the pinion with the rack.

To place the cups 45 and 46 in the casing 40, the same are passed through the opening 60 of the casing, which opening is provided with a door or closure 61, hinged at 62, and provided with a latch 63.

When the drawer is shoved in place, as shown in Fig. 2, the face plate 19 forms the front of the inclosure, as will be observed in Fig. 1.

From the foregoing it is to be noted that there has been produced a novel, simple, and efficient fumigator, for exterminating vermin, insects or the bugs from various fowls, and one which has been found to be exceedingly practicable in this line of industry.

The peat is a material for generating the necessary fire in the casing 40, and the fumes therefrom combined with the fumes from the brimstone are exceedingly detrimental to the vermin or insects. This peat substance is of a vegetable origin, and consists of roots, fibers, and the like. The fumes are forced from the casing 40 into the main inclosure or receptacle by entirely inclosing the damper 42. The drawer not only acts as such, but also constitutes a closure member for the inclosure. On the interior of the casing 40 is a deflector 63, which is adjustable as shown at 64, and designed for deflecting the fumigating material or fumes into the main receptacle or inclosure.

The peat is placed in the lower cup and the brimstone in the upper cup, the cups being so constructed and arranged that, the brimstone will run from the lower end of one cup, or overflow the same into the lower cup.

The invention having been set forth, what is claimed as new and useful is:—

1. In a fowl fumigating device, a main inclosure or receptacle including means whereby the fumes of the fumigating material may be directed thereinto, the receptacle or inclosure having a closure member movable relatively thereto provided with a wire wing holding member.

2. In a fowl fumigating device, a main inclosure or receptacle including means whereby the fumes of the fumigating material may be directed thereinto, the receptacle or inclosure having a closure member movable relatively thereto provided with a wire wing holding member, and means in the receptacle for regulating the intake of the fumigating material.

3. In combination, a main receptacle for the fowl having a supplemental receptacle adjacent thereto including means for generating fumigating material, guide rail in the main receptacle, a drawer closure for holding the fowl guided by the rails, the drawer closure having adjustable means for receiving the neck of the fowl, a mesh work basket above the drawer, and a top for the main receptacle, the basket adapted to hold the young, the drawer closure having a wire wing holding member, a shaft including a pinion, and a vertical slidable gate including a rack operated by the shaft and pinion.

4. In a fowl fumigating device, a main receptacle including means whereby fumes of fumigating material may be directed thereinto, the receptacle having guide rails, a drawer closure including a basket guided by the rails, a basket arranged on the interior of the receptacle to receive the young fowl, while the drawer closure receives the old fowl, the closure of the drawer and one side of the receptacle having means to receive the necks of the fowl.

5. In a fowl fumigating device, a main receptacle including means whereby fumes of fumigating material may be directed thereinto, a receptacle having guide rails, a drawer closure including a basket guided by the rails, a basket receptacle arranged above the drawer to receive the young fowl, while the drawer closure receives the old fowl, the drawer having a wire wing-holding member, the closure of the drawer and one side of the receptacle having like adjustable means to receive the necks of the fowl.

In witness whereof, the applicant's signature is hereunto affixed in the presence of two witnesses.

FRED M. NALL.

Witnesses:
 FRED J. RING,
 W. HENRY HELMS.

---

Copies of this patent may be obtained for five cents each, by addressing the "Commissioner of Patents, Washington, D. C."